United States Patent [19]

Hussmann et al.

[11] Patent Number: 5,283,082
[45] Date of Patent: Feb. 1, 1994

[54] METHOD FOR APPLYING SOLDER TO A BRAIDED SHIELD OF A CABLE

[75] Inventors: Carl H. Hussmann, Hamburg; Guenter Szaj, Steinbeck, both of Fed. Rep. of Germany

[73] Assignee: Minnesota Mining and Manufacturing Company, St. Paul, Minn.

[21] Appl. No.: 869,814

[22] Filed: Apr. 14, 1992

[30] Foreign Application Priority Data

May 17, 1991 [DE] Fed. Rep. of Germany ....... 4116165

[51] Int. Cl.⁵ .............................................. B05D 1/18
[52] U.S. Cl. ..................................... 427/118; 427/120; 29/828; 29/857; 29/860; 228/258
[58] Field of Search ....................... 427/117, 118, 120; 29/828, 860, 857; 228/256, 258, 259, 36

[56] References Cited

U.S. PATENT DOCUMENTS

| | | | |
|---|---|---|---|
| 3,688,811 | 9/1972 | Moriyama et al. | 29/828 |
| 4,144,404 | 3/1979 | De Groef et al. | 29/828 |
| 4,345,370 | 8/1982 | Cartier et al. | 29/828 |
| 4,697,339 | 10/1987 | Verhoeven | 29/828 |
| 4,719,697 | 1/1988 | Schwartzman et al. | 29/828 |
| 4,858,310 | 8/1989 | Sanders | 29/828 |

FOREIGN PATENT DOCUMENTS

| | | |
|---|---|---|
| 0001921 | 5/1979 | European Pat. Off. . |
| 0166817 | 1/1986 | European Pat. Off. . |
| 1923689 | 11/1970 | Fed. Rep. of Germany ........ 29/828 |
| 2720293 | 11/1978 | Fed. Rep. of Germany . |
| 0014639 | 8/1980 | Fed. Rep. of Germany . |
| 3600548 | 7/1987 | Fed. Rep. of Germany . |

OTHER PUBLICATIONS

Patent Abstracts of Japan, Group E0946 vol. 14, No. 302 Jun. 28, 1990.
Patent Abstracts of Japan, Group E1060, vol. 15, No. 161, Apr. 23, 1991.

*Primary Examiner*—R. Bruce Breneman
*Attorney, Agent, or Firm*—Gary L. Griswold; Walter N. Kirn; John C. Barnes

[57] ABSTRACT

A method for applying solder to a braided shield of a cable, particularly of a coaxial cable. A cable end portion is dipped into a solder bath a defined depth and for a defined time period prior to the removal of the jacket of the cable.

8 Claims, 1 Drawing Sheet

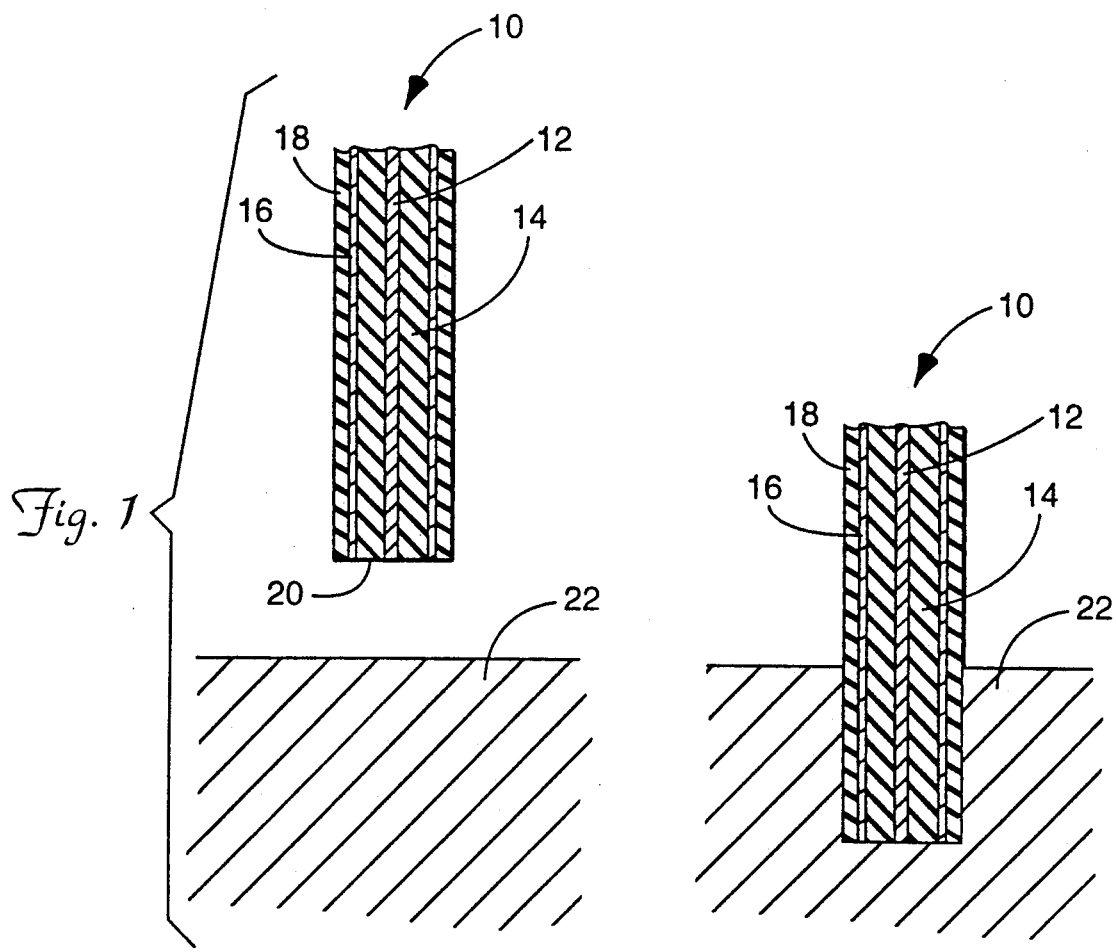
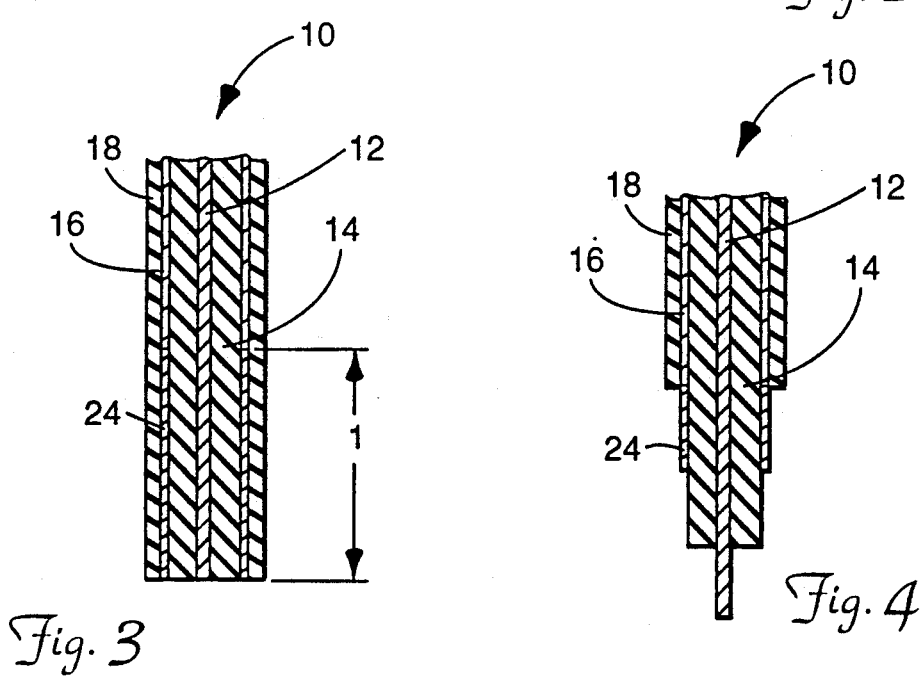

METHOD FOR APPLYING SOLDER TO A BRAIDED SHIELD OF A CABLE

FIELD OF THE INVENTION

The invention refers to a method for applying solder to a braided shield of a cable end portion surrounded by an insulation jacket.

BACKGROUND OF THE INVENTION

Frequently, the screen of a cable consists of braided electrically conductive material. In coaxial cables of high quality the quality of the shield inter alia is defined by the geometrical structure of the braid. If this structure is changed or damaged the screening effect suffers and thus also the transmission behavior of the cable.

The connection to a connector necessitates the removal of the insulation sheath or jacket and to expose the shield for the electric connection to a ground contact. The removal of the jacket may have an influence on the structure of the shield and thus on the screening effect. In case the shield consists of filaments or wires, they may spread at the end of the cable like a brush if exposed. It is extraordinarily difficult for the assembling person to introduce such a cable end into a connector such that the shield remains unchanged and on the spot. If the assembling is to be automated, it is hardly possible to tidily introduce the cable with its shield into the connector.

DESCRIPTION OF PRIOR ART

It is known to provide the end of a cable conductor with solder in order to facilitate the attachment to a contact and to improve the electrical transmission. From the German patent specification DE-OS 36 00 548 it is known to solder rod-like subjects e.g. solid-jacket cables by means of a solder bath in that the subject is dipped into the solder bath and subsequently freed from the surplus of the solder by suitable stripping means.

This method is not applicable if the shield consists of a braid because the shield is already affected and changed in its geometry by its exposure.

From the U.S. Pat. No. 4,858,310 a method has become known wherein a metal ferrule is attached to the end of a shield of a coaxial cable. To this purpose first the jacket is removed from the cable. Thereafter, the metal ferrule is pushed onto the shield leaving a small gap with respect to the shield. Finally, the cable and the ferrule are dipped into a solder bath. The solder ascends in the gap between the ferrule and the shield and effects a mechanically stable connection with the cable. This method may be advantageous for a number of cases. However, it cannot be used where the outer dimensions of the shield are not to be enlarged. For this reason, a method is to be excluded wherein the shield freed from the jacket is dipped into a solder bath. In this process, the solder effects a non-forecastable irregular geometry of the cable end which cannot be accepted for electrical and mechanical reasons.

SUMMARY OF THE INVENTION

The invention provides a method for applying solder to a braided shield of a cable, particular of a coaxial cable whereby the shield is furnished with high stability which allows an automatic assembly of the subsequently exposed shield without influencing the geometry of the shield.

In the method according the invention, the jacket first remains on the end portion of the cable, and cable is dipped into the solder bath a defined depth for a defined time together with the jacket. It has been recognized that at a suitable temperature of the solder bath and for an appropriate dipping time the jacket is not destroyed or damaged by the solder bath, rather remains substantially unchanged. The jacket material is somewhat swelled by the temperature allowing a penetration of the solder material between the jacket and shield, and maintaining shape of the shield substantially unchanged.

In the method of the invention, the solder material is not deposited on the shield as an outer layer, rather it penetrates into the meshes of the shield and interconnects the individual wires or filaments whereby a shield portion with a mechanically strong unchanged structure is achieved.

If the jacket is removed afterwards the geometrical structure of the shield is not affected, and the cable can be attached to a connector or a similar element by automatic process.

It has turned out that due to the capillary effect the solder penetrates into the braided shield beyond the dipping depth so that the dipping depth may be smaller than the desired length of the shield portion to be applied with solder.

It is appropriate to trim the cable end portion at the beginning of the process according to the invention. However, it is also possible to dip an unprepared cable end portion into a solder bath. The cable then is trimmed afterwards. This method has the deficiency that an unnecessary amount of solder material is used.

For some cases it may be appropriate to first dip the cable end portion into a solder flux bath. This reduces the dipping time.

The method according to the invention has a plurality of advantages. By the application of solder material according to the invention a strong shield portion is achieved having defined geometrical dimensions and a good dimensional stability. Such prepared cables can be used in an automated process. Further, the method according to the invention can be carried out completely Finally, the necessary amount of solder material is extremely small.

BRIEF THE DRAWINGS

The invention is explained in more detail with reference to the accompanying drawings.

FIG. 1 is a longitudinal sectional view of the end of a coaxial cable above a solder bath.

FIG. 2 is a view of the coaxial cable of FIG. 1 dipped into the solder bath.

FIG. 3 is a view of the coaxial cable of FIG. 2 after withdrawal from the solder bath.

FIG. 4 is a view of the coaxial cable of FIG. 3 after preparation.

DETAILED DESCRIPTION OF THE INVENTION

A coaxial cable 10 shown in the figures has a central conductor or core 12 of solid or stranded wire. The conductor 12 is surrounded by a dielectric material 14 which in turn is surrounded by a shield 16 of braided conductive material. A jacket 18 surrounds shield 16

The structure of such coaxial cable is generally conventional.

The cable 10 is trimmed at the end 20. In FIG. 1 it is disposed above a solder bath 22. The cable can be retained by suitable retaining means in conjunction with other cables with which the cable 10 can be dipped into the solder bath 22. The solder bath has a defined temperature, and the dipping time has a defined duration. If dipped the jacket 18 is somewhat modified and swelled whereby the solder material can enter the braided shield 16 from below due to a capillary effect. The amount of solder is limited by the jacket which forms a kind of mold for the solder material. After removal of cable 10 from the solder bath 22 as shown in FIG. 3 the cooled solder remains in the meshes of shield 16 as indicated in FIG. 3 at 24. Due to the capillary effect the length 1 of the shield portion according to FIG. 2. The outer dimension of shield 16, however, is not enlarged. Subsequently, the cable 10 may be prepared in usual manner as is known for the connection of coaxial cables with suitable connectors. Typical examples for 50 Ohm miniature coaxial cables are:

1. Capacitance 87 pico farads/m attenuation 84 dB/100 m at 400 MHz, velocity of propagation 69% of air, conductor 0,3 mm outer diameter, dielectric of PTFE 0,86 mm outer diameter, dielectric constant $\epsilon$, 2, 0, shield outer diameter 1,30 mm outer diameter 96% minimum coverage and jacket of FEP 1,8 mm outer diameter.
2. Capacitance 81 pico farads/m, attenuation 66 db/100 m at 400 MHz, velocity of propagation 82% of air, conductor 0,48 mm outer diameter, dielectric expanded PTFE 1,30 mm outer diameter, dielectric constant $\epsilon_1$, 1,3 shield 1,47 mm outer diameter, 90% coverage and jacket of FEP 1,98 mm outer diameter.

For such cables a typical method example is stated here
Temperature of the solder bath: 240° C.
Dipping depth: 10 mm
Length of the portion provided with solder: 14 mm
Dipping time: 8 seconds.

It is understood that different temperatures and dipping times may be selected in conformity with the dimensions and the kind of materials.

It may be appropriate to select a length for the portion to be provided with solder such that a portion of the shield provided with the solder material is left below the insulation jacket. By this, the cable is strengthened in the connection area beyond the connector whereby the coaxial cable is prevented from being bent which may cause an alteration of the electrical properties of the cable.

We claim:

1. A method for applying solder to a braided shield of electrical conductive material in the end portion of a coaxial cable, comprising a conductor surrounded by an insulative layer and a braided shield enclosed by a jacket, said method comprising the steps of dipping the cable end portion into a molten solder bath which is maintained at a temperature effective to restrict destruction or damage to said jacket during said dipping; and removing said cable end portion from said solder bath with said jacket remaining intact over said end portion.

2. The method of claim 1, comprising the step of trimming the end of the coaxial cable prior to its dipping into said bath to afford a clean cut end portion.

3. The method of claim 1, wherein said cable end portion is dipped to a depth less than the length of the shield portion to be soldered.

4. The method of claim 1, including the step of dipping said cable end portion into a solder flux bath prior to the step of dipping into said solder bath.

5. A method for applying solder to an end of a multi-wire braided conductor of a cable beneath a jacket, comprising the steps of cutting the cable to form an end, dipping said end into a molten solder bath to affording wicking of the solder between the braided conductor wires for interconnecting the braided conductor wires, and removing the cable end from the solder bath with said jacket remaining intact over said end.

6. The method of claim 2, wherein said cable end portion is dipped to a depth of 10 mm.

7. The method of claim 5, wherein said cable end portion is dipped to a depth of 10 mm.

8. The method of claim 5, comprising the steps of trimming the end of the cable and dipping the end portion in a flux bath, prior to dipping said end portion in said solder bath.

* * * * *